(12) United States Patent
Wang et al.

(10) Patent No.: US 8,034,453 B2
(45) Date of Patent: *Oct. 11, 2011

(54) COMPOSITE MATERIALS WITH IMPROVED BURN PROPERTIES

(75) Inventors: Yen-Seine Wang, San Ramon, CA (US); Yi-Jui Wu, San Leandro, CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,817

(22) Filed: Sep. 29, 2009

(65) Prior Publication Data

US 2010/0087587 A1    Apr. 8, 2010

Related U.S. Application Data

(63) Continuation-in-part of application No. 12/287,202, filed on Oct. 7, 2008.

(51) Int. Cl.
*B32B 27/04* (2006.01)
*B32B 5/16* (2006.01)
*C08L 63/00* (2006.01)
*C08L 101/00* (2006.01)

(52) U.S. Cl. ..... 428/413; 428/323; 428/327; 428/473.5; 524/538; 525/423; 525/436

(58) Field of Classification Search ............... 428/323, 428/327, 413, 473.5; 524/538; 525/423, 525/436

See application file for complete search history.

(56) References Cited

U.S. PATENT DOCUMENTS

| 5,268,223 A | 12/1993 | Qureshi et al. |
| 5,985,431 A | 11/1999 | Oosedo et al. |
| 2005/0008868 A1 | 1/2005 | Nakamura et al. |

FOREIGN PATENT DOCUMENTS

| CA | 2055642 A1 | 5/1992 |
| CA | 2055642 | 12/1993 |
| JP | 2008-007682 | * 1/2008 |
| WO | 2009/032809 A1 | 3/2009 |

OTHER PUBLICATIONS

Torlon Product Data Sheet, pp. 1-2, Jan. 2008.

* cited by examiner

*Primary Examiner* — Ana Woodward
(74) *Attorney, Agent, or Firm* — W. Mark Bielawski; David J. Oldenkamp

(57) ABSTRACT

Epoxy resins and composite materials that generate reduced levels of sulfur dioxide and which unexpectedly have reduced self-extinguishing times. The epoxy resins are composed of from 50 to 70 weight percent of an epoxy resin component. The epoxy resin composition also includes from 20 to 35 weight percent of a thermoplastic blend that is composed of polyetherimide and polyamideimide. The epoxy resin composition further includes from 5 to 25 weight percent of a curative agent. The composite materials may be used for primary structures in aircraft and other load-bearing structures.

20 Claims, 1 Drawing Sheet

US 8,034,453 B2

COMPOSITE MATERIALS WITH IMPROVED BURN PROPERTIES

This application is a continuation-in-part of co-pending U.S. patent application Ser. No. 12/287,202, which was filed on Oct. 7, 2008.

BACKGROUND OF THE INVENTION

1. Field of the Invention

The present invention relates generally to composite materials and the properties of such composite materials when they are burned. More particularly, the present invention involves improving the burn properties of composites that contain high performance epoxy resins by reducing the amount of sulfur-containing compounds that are emitted when such resins are burned and by also reducing the time it takes the epoxy resin to self-extinguish once it begins to burn.

2. Description of Related Art

Epoxy resins that are reinforced with a fibrous material, such as glass or carbon fiber, are used in a wide variety of situations where high structural strength and low-weight are required. Composite materials that use a high performance epoxy resin matrix are especially popular in the aerospace industry where weight and structural strength are important engineering and design considerations. High performance epoxy resins typically include one or more thermoplastic materials that provide "toughening" of the epoxy resin. Although such high performance epoxy resin composite materials are desirable because of their relatively high strength to weight ratio, they do present some specific issues with respect to flammability, toxic emissions and other burn properties.

High performance epoxy resins of the type that are used in the aerospace industry are generally cured at temperatures of about 177° C. These high performance epoxy resins typically include thermoplastic tougheners and curing agents that contain sulfur. These types of epoxy resins tend to generate toxic sulfur-containing gases when they are burned. The generation of toxic gas is of particular concern when epoxy resin composite parts are located in the interior of aircraft or other aerospace vehicles. A major goal in developing formulations for such high performance epoxy resins is to limit the amount of sulfur emissions that are produced upon burning, while at the same time not reducing the structural strength of the cured composite part. It is also important that any attempt to reduce sulfur emissions does not adversely affect properties of the uncured epoxy resin, such as tack and viscosity. The tack and viscosity of the uncured resin are especially important when the epoxy resin is used to make prepreg, which is a common intermediate material used in the fabrication of aerospace parts.

Resistance to surface flammability is also an important area of concern for high performance epoxy resins. It is important that an epoxy resin composite part, which is on fire, be able to self-extinguish once the source of heat and/or flame is removed. It is also a significant goal of epoxy resin formulators to develop epoxy resins that are self-extinguishing in as short a time period as possible, while at the same time keeping structural strength of the finished composite part at the levels needed for aerospace applications. The same requirement that the tack and viscosity of the uncured epoxy resin not be adversely affected applies with respect to attempts to formulate epoxy resins with low self-extinguishing times.

Sulfur, which is principally in the form of sulfur dioxide ($SO_2$), is a toxic compound that is emitted when a high performance epoxy resin part burns. The National Bureau of Standards (NBS) Smoke Density Chamber is a standard combustion test system that is used to measure $SO_2$ emissions, as well as emission levels of carbon monoxide (CO), hydrogen cyanide (HCN) and nitrogen oxides ($NO_x$). The $SO_2$ emission level is determined by measuring the amount of $SO_2$ in parts per million (ppm) that is released by a sample during combustion under specified thermal exposure conditions in the NBS Smoke Density Chamber.

The specific combustion parameters that are used for measuring the $SO_2$ emission levels of high performance epoxy resin composite materials are set forth in BOEING Specification Support Standard BSS-7238 (Revision B) and BSS-7239 (Revision A), which is recognized in the aerospace industry as a standard test method. The $SO_2$ emission levels for a typical high performance epoxy resin that contains polyether sulfone (PES) or other sulfur-containing thermoplastic toughener will be over 100 ppm. An exemplary PES-toughened high performance epoxy resin is HexPly® resin 8552, which is available from Hexcel Corporation (Dublin, Calif.). It would be desirable to provide epoxy resin formulations where the $SO_2$ levels are 100 ppm or lower.

The United States Federal Aviation Administration has established regulations and requirements for fire resistance of aircraft interior parts and materials. These requirements are set forth in FAR Section 25.853. One requirement is that the material be able to self-extinguish once the flame source is removed. The test procedure for measuring the self-extinguishing time for epoxy resins are set forth in the FAA Aircraft Materials Fire Test Handbook (FAR 25.853 Appendix F part 1) and in BOEING Specification Support Standard BSS-7230 (Revision H), which is recognized in the aerospace industry as a standard test method. A modified version of Method F of BSS-7230 (Revision H) involves igniting a vertically oriented sample of cured neat resin by exposing it to an ignition source for 10 seconds and then measuring the time it takes for the sample to self extinguish. It would be desirable to provide high performance epoxy resin compositions where the self-extinguishing times are as short as possible.

In addition, it would be beneficial to use resins that have the desired burn properties describe above to make composite parts that can be used as primary (load-bearing) structures in aircraft. A common test that is used to determine the suitability of a composite material to function as a primary aircraft structure is the open hole compression (OHC) test. The test involves accurately drilling a hole in the composite material and measuring the response of the material to compressive forces. The test provides a controlled simulation of the composite materials response to a defect in the composite structure and also doubles as a method for testing the strength of fastener holes. ASTM D 6484 and BSS-7260 are the standard tests used to measure OHC. It is desirable that the composite material have an OHC value as high as possible when it is being used in a primary aircraft structure.

SUMMARY OF THE INVENTION

In accordance with the present invention, it was discovered that high performance toughened epoxy resin compositions, which have a particular blend of thermoplastic toughening agents, can be cured to provide epoxy resins that have significantly reduced $SO_2$ emissions and unexpectedly short self-extinguishing times when compared to existing high performance toughened epoxy resin systems.

The epoxy resin compositions of the present invention are composed of from 50 to 70 weight percent of an epoxy resin component that includes one or more epoxy resins. In addition, the epoxy resin compositions include from 15 to 35 weight percent of a thermoplastic blend that includes polyetherimide and polyamideimide. A curative agent in an amount ranging from 5 to 25 weight percent is also included.

The epoxy component and thermoplastic blend of the present invention do not contain significant amounts of sulfur. The curative agent may include sulfur-containing compounds. The amount of curative compounds is limited to provide cured epoxy resins that have $SO_2$ emission levels below 100 ppm. It was discovered that these low sulfur-containing epoxy resins in accordance with the present invention not only had low $SO_2$ emissions, but also had unexpectedly short self-extinguishing times.

The present invention covers the uncured epoxy resin compositions, as well as prepreg that incorporate the uncured or partially cured epoxy resin compositions. In addition, the invention covers cured epoxy resin compositions and fiber reinforced composite parts wherein the resin matrix is a cured epoxy resin composition in accordance with the present invention. The composite parts were found to have high open hole compression (OHC) values, which make them suitable for use as primary structure in aircraft and other load-bearing applications where high strength is required.

The invention also covers methods for making uncured epoxy resin compositions and cured parts and products that incorporate the epoxy resin composition.

In addition to primary, load-bearing aerospace structures, composite parts that incorporate epoxy resin compositions in accordance with the present invention are well-suited for use in the interiors of aerospace vehicles, such as airplanes, where the combination of high structural strength, low weight, short self-extinguishing times and low $SO_2$ emission levels are particularly desirable.

The above described and many other features and attendant advantages of the present invention will become better understood by reference to the following detailed description when taken in conjunction with the accompanying drawings.

DETAILED DESCRIPTION OF THE INVENTION

Epoxy resin compositions in accordance with the present invention may be used in a wide variety of situations where a thermoplastic-toughened epoxy resin is desired. Although the epoxy resin compositions may be used alone, the compositions are generally combined with a fibrous support to form composite materials. The composite materials may be in the form of a prepreg or cured final part. Although the composite materials may be used for any intended purpose, they are preferably used in aerospace applications for the interior of aerospace vehicles and particularly preferred for use in commercial aircraft. For example, the composite materials may be used in the aircraft galley and lavatory and as window frames, floor panels, overhead storage bins, wall partitions, wardrobes, ducts, ceiling panels and interior sidewalls. In addition, the composite materials may be used to make primary aircraft structures. Primary aircraft structures or parts are those elements of either fixed-wing or rotary wing aircraft that undergo significant stress during flight and which are essential for the aircraft to maintain controlled flight. The composite materials may also be used to make "load-bearing" parts and structures in general.

Figure 1:
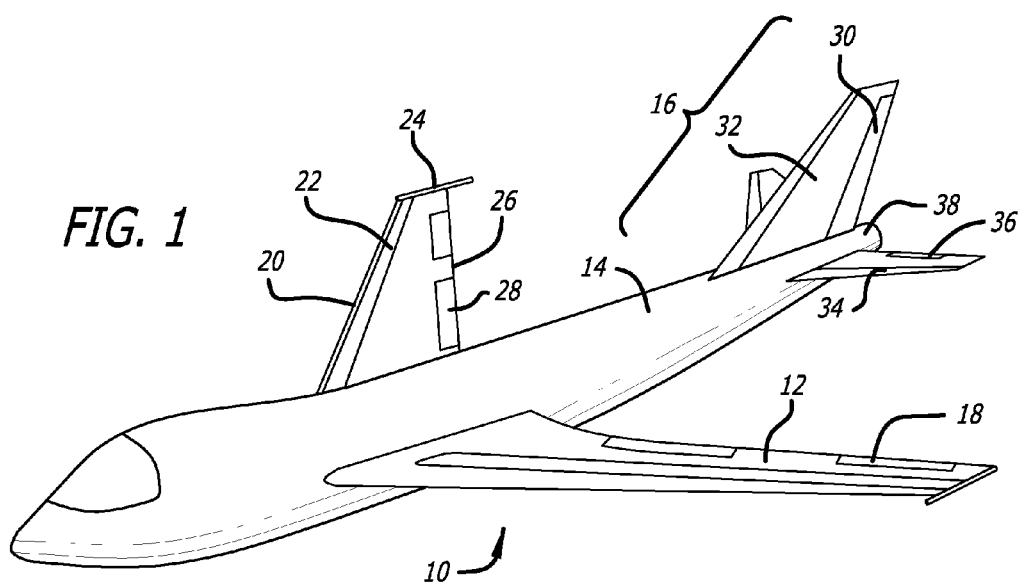
FIG. 1 is a perspective view of an aircraft, which depicts exemplary primary aircraft structures that can be made using composite materials in accordance with the present invention.
Figure 2:
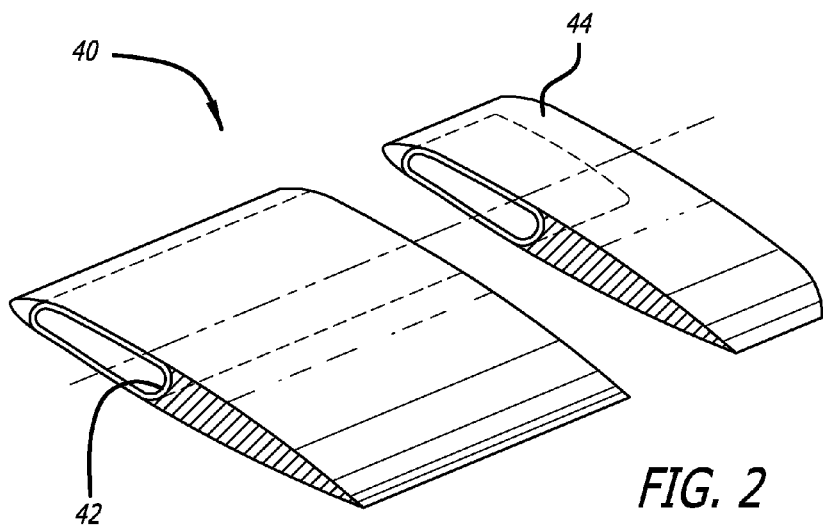
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32 horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The epoxy resin composition itself includes from 50 to 70 weight percent of an epoxy resin component that includes one or more epoxy resins. The epoxy resins may be selected from any of the epoxy resins that are used in high performance aerospace epoxies. Difunctional, trifunctional and tetrafunctional epoxy resins may be used. Preferably, the epoxy resin component will be a combination of trifunctional and tetrafunctional epoxy compounds. The relative amounts of trifunctional and tetrafunctional epoxies may be varied. However, it is preferred that the amount of trifunctional epoxy is greater than or equal to the amount of tetrafunctional epoxy.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups in the backbone of the compound. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group.

Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred trifunctional epoxy is the triglycidyl ether of para aminophenol, which is available commercially as Araldite MY 0500 or MY 0510 from Huntsman Advanced Materials (Monthey, Switzerland).

Suitable tetrafunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred tetrafunctional epoxy is N,N,N',N'-tetraglycidyl-m-xylenediamine, which is available commercially as Araldite MY0720 or MY0721 from Huntsman Advanced Materials (Monthey, Switzerland).

If desired, the epoxy resin component may also include a difunctional epoxy, such a Bisphenol-A (Bis-A) or Bisphenol-F (Bis-F) epoxy resin. Exemplary Bis-A epoxy resin is available commercially as Araldite GY6010 (Huntsman Advanced Materials) or DER 331, which is available from Dow Chemical Company (Midland, Mich.). Exemplary Bis-F epoxy resin is available commercially as Araldite GY281 and GY285 (Huntsman Advanced Materials). The amount of Bis-A or Bis-F epoxy resin present in the epoxy resin component may be varied. It is preferred that no more than 20 weight percent of the total epoxy resin composition be difunctional epoxy resin.

The epoxy resin composition also includes from 15 to 35 weight percent of a thermoplastic blend that is composed of polyetherimide (PEI) and polyamideimide (PAI). These two thermoplastic compounds do not contain sulfur. Thermoplastics that contain sulfur, such as polyether sulfone (PES) are not suitable for use as the thermoplastic component. The thermoplastic blend in accordance with the present invention includes one thermoplastic compound (I.e. PEI) that is soluble in the epoxy resin component and the other (i.e. PAI) is not soluble in the epoxy resin component. The relative amounts of PEI and PAI may be varied between weight ratios (PEI:PAI) of 5:1 to 1:5. Preferably, the weight ratios (PEI:PAI) will vary between 3:1 and 1:3.

Polyetherimide is available commercially as ULTEM 1000P from Sabic (Dubai). Polyamideimide is available commercially as TORLON 4000T or TORLON 4000TF from Solvay Advanced Polymers (Alpharetta, Ga.). PEI thermoplastics are typically supplied as powders where the PEI particles range in size from about 30 to 300 microns. The particle size of the PEI particles is not particularly important, since the PEI powder is dissolved in the epoxy component during preparation of the epoxy resin composition. Commercially available PAI powders typically have average particle sizes 50 μm.

The epoxy resin composition is prepared by mixing the PEI particles and PAI particles with the epoxy resin component and heating the resulting mixture to a temperature of around 120° C. for a sufficient time to completely dissolve the PEI particles. The PAI particles do not dissolve. The time necessary for the PEI particles to dissolve will vary from 10 minutes to one hour or more depending upon the size of the PEI particles. If desired, the PEI particles may be dissolved first and then the PAI particles are added.

After the PEI particles are dissolved, the mixture is cooled to 90° C. or below and the curative agent component (and PAI particles, if not previously added) is added to form the epoxy resin composition that is ready for curing. The particle size and amount of PAI is selected so that the viscosity of the epoxy resin composition is within a range that is suitable for prepreg preparation. The preferred average particle size range for the PAI particles is from 8 microns to 20 microns. Accordingly, it is preferred that commercially available PAI powder be ground or otherwise processed in order to provide a powder having the desired smaller particle size. It is preferred that the viscosity of the resin be the same as the viscosity of existing high performance toughened resins that are presently used in the aerospace industry to make prepreg including quasi-isotropic chopped prepreg.

The amount of curative agent component that is added to the cooled mixture of epoxy resin component and thermoplastic blend is from 5 to 25 weight percent of the total weight of the epoxy resin composition. Exemplary curative agents in accordance with the present invention include dicyandiamide, methylenedianiline (MDA), m-phenylenediamine (MPDA), 4,4'-methylenebis(2,6-diethylaniline), which do not contain sulfur and 3,3'-diaminodiphenyl sulfone (3,3'-DDS) and 4,4'-diaminodiphenyl sulfone (4,4'-DDS), which do contain sulfur.

3,3'-DDS and 4,4'-DDS are preferred curative agents. It is particularly preferred that a mixture of these two sulfur-containing curatives be used. The relative amounts of 3,3'-DDS and 4,4'-DDS may be varied provided that the overall loading of curative agent remains within the 5 to 25 weight percent range and the $SO_2$ emissions level of the cured resin remains below 100 ppm. Dicyandiamide is also a preferred curative agent that may be included along with or in place of the sulfur-containing curative agents, such as 3,3'-DDS and 4,4'-DDS.

One or more cure accelerators may be included in the epoxy resin composition provided that the self-extinguishing time for the cured resin is not adversely affected and the $SO_2$ emission levels remain below 100 ppm. In addition, the amount of accelerator used must not adversely affect the properties of the uncured resin, such as viscosity and tack, so as to make the resin difficult to use in forming prepreg. Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa). The amount of accelerator present in the epoxy resin composition, if any, should be kept below 2 weight percent of the total composition. The use of a catalyst is not preferred.

The epoxy resin composition may also include additional ingredients, such as performance enhancing and/or modifying agents provided that they also do not adversely affect the viscosity and tack of the uncured resin so as to make it unsuitable for making prepreg. In addition, the $SO_2$ emission level must remain below 100 ppm as set forth above. The performance enhancing or modifying agents, for example, may be selected from: flexibilizers, particulate fillers, nanoparticles, core/shell rubber particles, flame retardants, wetting agents, pigments/dyes, conducting particles, and viscosity modifiers. It is preferred that the resin composition does not include additional ingredients. It is preferred that the resin composition be limited to the epoxy component, thermoplastic component and curative agent component.

The epoxy resin composition of the present invention is made in accordance with standard resin processing procedures for high performance toughened epoxy resins. The various trifunctional and tetrafunctional epoxy resins are mixed together at room temperature to form an epoxy resin component to which the PEI and PAI portions of the thermoplastic component are added. This mixture is then heated as previously described to a temperature at which the PEI is dissolved. The mixture is then cooled down to 90° C. or below and the curative agent and other additives, if any, are mixed into the resin to form the final epoxy resin composition that is impregnated into the fiber reinforcement. If desired, the PAI may be added after the PEI has been dissolved in the epoxy resin component.

The epoxy resin composition is applied to the fibrous reinforcement in accordance with any of the known prepreg manufacturing techniques. The fibrous reinforcement may be fully impregnated with the epoxy resin composition. The prepreg is typically covered on both sides with a protective film and rolled up for storage and shipment at temperatures that are typically kept well below room temperature to avoid premature curing. Any of the other prepreg manufacturing processes and storage/shipping systems may be used, if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The fibrous reinforcement may be in a woven, non-crimped, non-woven, unidirectional, or multi-axial textile structure form, such as quasi-isotropic chopped pieces of unidirectional fibers. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, tow-pregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing. The amount of resin (resin content) in the prepreg may vary from 20 to 60 weight percent of the total prepreg weight. Resin contents on the order of 30 to 45 weight percent are preferred.

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 200° C. with curing temperatures of between about 175° C. and 185° C. being preferred. Compression molding of quasi-isotropic chopped prepreg or molding material is a preferred procedure. The quasi-isotropic chopped prepreg is the same as HexMC® compression molding material that is available from Hexcel Corporation (Dublin, Calif.), except that the resin component of this quasi-isotropic chopped prepreg is made in accordance with the present invention. Such quasi-isotropic materials are described in EP 113431 B1 and U.S. patent application Ser. No. 11/476,965. Unidirectional prepreg, alone or in combination with woven prepreg or quasi-isotropic chopped prepreg is also a preferred material for making load bearing parts. Unidirectional fiber tape is available from a variety of commercial sources. For example IM7G unidirectional fiber tape is available from Hexcel Corporation (Dublin, Calif.).

It is preferred that the composite materials in accordance with the present invention that are used to form primary structures have room temperature OHC values (as determined by ASTM D 6484 or BSS 7260) of at least 45 ksi using the following lay up sequence: [+45/0/−45/90]2s. OHC values of at least 46 ksi at room temperature are particularly preferred. OHC may also be determined at elevated temperature (104° C.) and under wet conditions. It is preferred that composite materials in accordance with the present invention have OHC values of at least 34 ksi and more preferably at least 35 ksi under elevated temperature/wet conditions.

In accordance with the present invention, the epoxy resin composition will include: 50 to 70 weight percent of an epoxy component that is made up of one or more bifunctional, trifunctional and/or tetrafunctional epoxy resins; 15 to 35 weight percent of a thermoplastic blend that includes polyetherimide and polyamideimide wherein the weight ratio of polyetherimide to polyamideimide is from 5:1 to 1:5; and from 5 to 25 weight percent of a curative agent. Further in accordance with the present invention, the resulting laminate made using the epoxy resin will have $SO_2$ emission levels, as measured by BOEING Specification Support Standards BSS-7238 (Revision B) and BSS-7239 (Revision A) of less than 100 ppm. It should be noted that whenever a reference is made herein to the $SO_2$ emission level of the epoxy resin composition, that such reference is understood to mean the $SO_2$ emission level of a laminate made using the resin as determined by BOEING Specification Support Standards BSS-7238 (Revision B) and BSS-7239 (Revision A).

In addition to the above requirements, the epoxy resin compositions of the present invention will have the viscosity and tack that is required in order for the resin to be used in the formation of prepreg. The viscosity of the epoxy resin compositions should be similar to existing high performance toughened epoxy resins, such as HexPly® resins 8552, that is now being used to make prepreg. The tack should be sufficiently low to allow the prepreg to be handled for transport and storage, while at the same time being sufficiently high to allow multiple layers of prepreg to be applied and used with molds in accordance with known prepreg molding/curing procedure. When used as the resin matrix for a molding compound, such as quasi-isotropic chopped prepreg, the resin should have viscosity and tack properties that are similar to existing matrix resins, such as HexPly® resins 8552.

Preferred epoxy resin compositions have the following formulation: an epoxy component made up of from 35 to 39 weight percent of a trifunctional epoxy and from 17 to 21 weight percent of a tetrafunctional epoxy; a thermoplastic component made up of from 14 to 18 weight percent polyetherimide and from 4 to 8 weight percent polyamideimide; and from 2 to 6 weight percent 3,3'-diaminodiphenyl sulphone and from 15 to 19 weight percent 4,4'-diaminodiphenyl sulphone. These preferred epoxy resin compositions meet the required $SO_2$ emission level and self-extinguishing time set forth above, while still retaining desired prepreg handling properties in accordance with the present invention.

Other preferred epoxy resin compositions are those that have the following formulation: an epoxy component made up of from 32 to 34 weight percent of a trifunctional epoxy and from 32 to 34 weight percent of a tetrafunctional epoxy; a thermoplastic component made up of from 9 to 11 weight percent polyetherimide and from 9 to 11 weight percent polyamideimide; from 5 to 15 weight percent 3,3'-diaminodiphenyl sulphone and/or 4,4'-diaminodiphenyl sulphone and up to 2 weight percent dicyandiamide. These preferred epoxy resin compositions meet the required $SO_2$ emission level and self-extinguishing time set forth above, while still retaining desired prepreg handling properties in accordance with the present invention.

When the resin is to be used to make composite parts that form primary aircraft parts or structures, it is preferred that the thermoplastic component be at least 20 weight percent of the resin and the ratio of polyetherimide to polyamideimide be between 3:1 and 1:3. Resins where the thermoplastic component is about 25 weight percent and the ratio of polyetherimide to polyamideimide is from 2:1 to 1:2 provide especially high OHC values at room temperature. Polyetherimide to polyamideimide ratios of between 1.9:1 and 1.5:1 are particularly preferred to provide high OHC values at room temperature. Polyetherimide to polyamideimide ratios of around 3:1 are preferred to provide high OHC values at elevated temperatures and wet conditions. To provide a balance between room temperature and elevated temperature OHC performance, it is preferred that the ratio of polyetherimide to polyamideimide is between 2.5:1 and 2.9:1 and the total amount of thermoplastic component be between 22 and 24 weight percent. Particularly preferred resin compositions are those that contain between 22 and 23 weight percent thermoplastic component where the polyetherimide to polyamideimide ratio is about 2.7:1. Resin formulations containing from 10 to 23 weight percent polyetherimide and from 2 to 15 weight percent are preferred.

If desired, small amounts of other thermoplastic may be used in combination with PEI or PAI. For example, in situations where the aircraft primary structure is not located in the interior of the aircraft, polyethersulfone (PES) and other sulfur containing thermoplastic materials may be added to supplement and/or replace a portion of the PEI in the thermoplastic blend. Amounts of PES or other sulfur containing thermoplastics should not form more that 25 weight percent of the "PEI" portion of the thermoplastic blend. Polyamide (PA) and other similar thermoplastics may be added to supplement and/or replace a portion of the PAI in the thermoplastic blend. Amounts of PA or other similar thermoplastics should not form more than 25 weight percent of the "PAI" portion of the thermoplastic blend.

Examples of practice are as follows:

EXAMPLE 1

An exemplary epoxy resin composition having the following formulation was prepared:
37.38 weight percent trifunctional epoxy (MY0510)
18.69 weight percent tetrafunctional epoxy (MY0721)
16.36 weight percent polyetherimide (ULTEM 1000P)
6.07 weight percent polyamideimide (TORLON 4000TF)
4.44 weight percent 3,3'-DDS
17.06 weight percent 4,4'-DDS The two epoxy resins and PEI and PAI particles were mixed together at room temperature and heated to 120° C. for 20 minutes in order to completely dissolve the PEI particles. For all of the examples, TORLON TF powder was ground and sieved to provide PAI powder having an average particle size of 15 μm. This mixture was cooled to 90° C. and curing agents were added and mixed in thoroughly to form the epoxy resin composition. The resin had viscosity and tack that was similar to existing high performance toughened resins, such as HexPly® resin 8552. A layer of resin was formed that was 0.32 cm thick. This layer of resin was cured in an autoclave at 177° C. for 120 minutes to form a fully cured layer of the epoxy resin composition. The cured layer was cut into cured resin test samples that were 7.6 cm×15.2 cm×0.32 cm.

A cured laminate test sample was tested for $SO_2$ emissions in accordance with BOEING Specification Support Standards BSS-7238 (Revision B) and BSS-7239 (Revision A). The test sample had an $SO_2$ emission level that was well below 100 ppm. A cured resin test sample was subjected to a 10 second vertical burn test to determine the self-extinguishing time in accordance with modified Method F of BSS-7230 (Revision H). The cured resin test sample had a self-extinguish time of 11 seconds. The MC value of this material was measured at 1440 psi-in$^{1/2}$.

EXAMPLE 2

An exemplary epoxy resin composition having the following formulation was prepared:
37.38 weight percent trifunctional epoxy (MY0510)
18.69 weight percent tetrafunctional epoxy (MY0721)
16.36 weight percent polyetherimide (ULTEM 1000P)
6.07 weight percent polyamideimide (TORLON 4000TF)
17.06 weight percent 3,3'-DDS
4.44 weight percent 4,4'-DDS The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as HexPly® resin 8552. A layer of resin was formed that was 0.32 cm thick. This layer of resin was cured in an autoclave at 177° C. for 120 minutes to form a fully cured layer of the epoxy resin composition. The cured layer was cut into cured resin test samples that were 7.6 cm×15.2 cm×0.32 cm.

A cured laminate test sample was tested for $SO_2$ emissions in accordance with BOEING Specification Support Standards BSS-7238 (Revision B) and BSS-7239 (Revision A). The test sample had an $SO_2$ emission level that was well below 100 ppm. A cured resin test sample was subjected to a 10 second vertical burn test to determine the self-extinguishing time in accordance with modified Method F of BSS-7230 (Revision H). The cured resin test sample had a self-extinguish time of 14 seconds. The KIC value of this material was measured at 1390 psi-in$^{1/2}$.

EXAMPLE 3

An exemplary epoxy resin composition having the following formulation was prepared:
37.38 weight percent trifunctional epoxy (MY0510)
18.69 weight percent tetrafunctional epoxy (MY0721)
11.68 weight percent polyetherimide (ULTEM 1000P)
10.75 weight percent polyamideimide (TORLON 4000TF)
4.44 weight percent 3,3'-DDS
17.06 weight percent 4,4'-DDS The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as HexPly® resin 8552. A layer of resin was formed that was 0.32 cm thick. This layer of resin was cured in an autoclave at 177° C. for 120 minutes to form a fully cured layer of the epoxy resin composition. The cured layer was cut into a test sample that was 7.6 cm×15.2 cm×0.32 cm.

The test sample was subjected to a 10 second vertical burn test to determine the self-extinguishing time in accordance with modified Method F of BSS-7230 (Revision H). The test sample had a self-extinguish time of 13 seconds.

EXAMPLE 4

An exemplary epoxy resin composition having the following formulation was prepared:
38.00 weight percent trifunctional epoxy (MY0510)
19.00 weight percent tetrafunctional epoxy (MY0721)
11.40 weight percent polyetherimide (ULTEM 1000P)
11.40 weight percent polyamideimide (TORLON 4000TF)

4.52 weight percent 3,3'-DDS
14.85 weight percent 4,4'-DDS
0.83 weight percent dicyandiamide The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as Hex-Ply® resin 8552. A layer of resin was formed that was 0.32 cm thick. This layer of resin was cured in an autoclave at 177° C. for 120 minutes to form a fully cured layer of the epoxy resin composition. The cured layer was cut into a test sample that was 7.6 cm×15.2 cm×0.32 cm.

The test sample was subjected to a 10 second vertical burn test to determine the self-extinguishing time in accordance with modified Method F of BSS-7230 (Revision H). The test sample had a self-extinguish time of 17 seconds.

EXAMPLE 5

An exemplary epoxy resin composition having the following formulation was prepared:
38.28 weight percent trifunctional epoxy (MY0510)
19.14 weight percent tetrafunctional epoxy (MY0721)
11.96 weight percent polyetherimide (ULTEM 1000P)
11.00 weight percent polyamideimide (TORLON 4000TF)
4.55 weight percent 3,3'-DDS
13.87 weight percent 4,4'-DDS
1.20 weight percent dicyandiamide The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as Hex-Ply® resin 8552. A layer of resin was formed that was 0.32 cm thick. This layer of resin was cured in an autoclave at 177° C. for 120 minutes to form a fully cured layer of the epoxy resin composition. The cured layer was cut into a test sample that was 7.6 cm×15.2 cm×0.32 cm.

The test sample was subjected to a 10 second vertical burn test to determine the self-extinguishing time in accordance with modified Method F of BSS-7230 (Revision H). The test sample had a self-extinguish time of 24 seconds.

EXAMPLE 6

An exemplary epoxy resin composition having the following formulation was prepared:
38.28 weight percent trifunctional epoxy (MY0510)
19.14 weight percent tetrafunctional epoxy (MY0721)
16.75 weight percent polyetherimide (ULTEM 1000P)
6.21 weight percent polyamideimide (TORLON 4000TF)
4.55 weight percent 3,3'-DDS
14.85 weight percent 4,4'-DDS
1.20 weight percent dicyandiamide The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as Hex-Ply® resin 8552. A layer of resin was formed that was 0.32 cm thick. This layer of resin was cured in an autoclave at 177° C. for 120 minutes to form a fully cured layer of the epoxy resin composition. The cured layer was cut into a test sample that was 7.6 cm×15.2 cm×0.32 cm The test sample was subjected to a 10 second vertical burn test to determine the self-extinguishing time in accordance with modified Method F of BSS-7230 (Revision H). The test sample had a self-extinguish time of 38 seconds.

EXAMPLE 7

An exemplary epoxy resin composition having the following formulation was prepared:
32.93 weight percent trifunctional epoxy (MY0510)
32.88 weight percent tetrafunctional epoxy (MY0721)
9.98 weight percent polyetherimide (ULTEM 1000P)
9.97 weight percent polyamideimide (TORLON 4000TF)
0.00 weight percent 3,3'-DDS
12.58 weight percent 4,4'-DDS
1.66 weight percent dicyandiamide The two epoxy resins and PEI and PAI particles were mixed together at room temperature and heated to 120° C. for 20 minutes in order to completely dissolve the PEI particles. This mixture was cooled to 90° C. and curing agents were added and mixed in thoroughly to form the epoxy resin composition. The resin had viscosity and tack that was similar to existing high performance toughened resins, such as Hex-Ply® resin 8552. A layer of resin was formed that was 0.32 cm thick. This layer of resin was cured in an autoclave at 177° C. for 120 minutes to form a fully cured layer of the epoxy resin composition. The cured layer was cut into a test sample that was 7.6 cm×15.2 cm×0.32 cm.

The test sample was subjected to a 10 second vertical burn test to determine the self-extinguishing time in accordance with modified Method F of BSS-7230 (Revision H). The test sample had a self-extinguish time of 51 seconds.

COMPARATIVE EXAMPLE 1

An exemplary comparative epoxy resin composition having the following formulation was prepared:
37.38 weight percent trifunctional epoxy (MY0510)
18.69 weight percent tetrafunctional epoxy (MY0721)
16.36 weight percent polyether sulfone (5003P)
0.00 weight percent polyetherimide (ULTEM 1000P)
6.07 weight percent polyamideimide (TORLON 4000TF)
17.06 weight percent 3,3'-DDS
4.44 weight percent 4,4'-DDS The comparative epoxy resin composition was prepared and cured in the same manner as Examples 1, 2 and 3, except that polyetherimide was deleted from the thermoplastic blend and polyether sulfone was added. The 0.32 cm thick-layer of cured comparative resin was cut into a test sample as described in Examples 1, 2 and 3. $SO_2$ emission levels were not tested, since it is known that the presence of 16 weight percent of polyether sulfone in the resin will result in $SO_2$ emission levels of well over 100 ppm.

The test sample of cured comparative resin was subjected to a 10 second vertical burn test to determine the self-extinguishing time in accordance with modified Method F of BSS-7230 (Revision H). The test sample had a self-extinguish time of 60 seconds. This is much higher than the unexpectedly low self-extinguishing times for the cured resins of Examples 1, 2 and 3 (11 seconds, 14 seconds and 13 seconds, respectively) that include a blend of polyetherimide and polyamideimide in place of polyether sulfone in accordance with the present invention.

COMPARATIVE EXAMPLE 2

An exemplary comparative epoxy resin composition having the following formulation was prepared:
   38.00 weight percent trifunctional epoxy (MY0510)
   19.00 weight percent tetrafunctional epoxy (MY0721)
   22.80 weight percent polyetherimide (ULTEM 1000P)
      0.00 weight percent polyamideimide (TORLON 4000TF)
      4.52 weight percent 3,3'-DDS
   14.85 weight percent 4,4'-DDS
      0.83 dicyandiamide The comparative epoxy resin composition was prepared and cured in the same manner as Example 4, except that polyamideimide was deleted from the thermoplastic blend. The 0.32 cm thick-layer of cured comparative resin was cut into a test sample as described in Example 4.

The test sample of cured comparative resin was subjected to a 10 second vertical burn test to determine the self-extinguishing time in accordance with modified Method F of BSS-7230 (Revision H). The test sample had a self-extinguish time of 30 seconds. This is much higher than the unexpectedly low (17 second) self-extinguishing time for the cured resin of Example 4 that includes a blend of polyetherimide and polyamideimide in accordance with the present invention.

COMPARATIVE EXAMPLE 3

An exemplary comparative epoxy resin composition having the following formulation was prepared:
   38.27 weight percent trifunctional epoxy (MY0510)
   19.14 weight percent tetrafunctional epoxy (MY0721)
   22.96 weight percent polyetherimide (ULTEM 1000P)
      0.00 weight percent polyamideimide (TORLON 4000TF)
      4.55 weight percent 3,3'-DDS
   13.88 weight percent 4,4'-DDS
      1.20 weight percent dicyandiamide The comparative epoxy resin composition was prepared and cured in the same manner as Examples 5 and 6, except that polyamideimide was deleted from the thermoplastic blend. The 0.32 cm thick-layer of cured comparative resin was cut into a test sample as described in Examples 5 and 6.

The test sample of cured comparative resin was subjected to a 10 second vertical burn test to determine the self-extinguishing time in accordance with modified Method F of BSS-7230 (Revision H). The test sample had a self-extinguish time of over 100 seconds. This is much higher than the unexpectedly low (24 second and 38 second, respectively) self-extinguishing times for the cured resins of Examples 5 and 6 that include a blend of polyetherimide and polyamideimide in accordance with the present invention.

COMPARATIVE EXAMPLE 4

An exemplary comparative epoxy resin composition having the following formulation was prepared:
   32.93 weight percent trifunctional epoxy (MY0510)
   32.88 weight percent tetrafunctional epoxy (MY0721)
   19.95 weight percent polyetherimide (ULTEM 1000P)
      0.00 weight percent polyamideimide (TORLON 4000TF)
      0.00 weight percent 3,3'-DDS
   12.58 weight percent 4,4'-DDS
      1.66 dicyandiamide The comparative epoxy resin composition was prepared and cured in the same manner as Example 7, except that polyamideimide was deleted from the thermoplastic blend. The 0.32 cm thick-layer of cured comparative resin was cut into a test sample as described in Example 7.

The test sample of cured comparative resin was subjected to a 10 second vertical burn test to determine the self-extinguishing time in accordance with modified Method F of BSS-7230 (Revision H). The test sample had a self-extinguish time of over 100 seconds. This is much higher than the unexpectedly low (51 second) self-extinguishing time for the cured resin of Example 7 that includes a blend of polyetherimide and polyamideimide in accordance with the present invention.

The above examples and comparative examples demonstrate that the present invention not only provides a large decrease in $SO_2$ emissions, but also provides unexpectedly short self-extinguishing times. As a further advantage, these improved burn properties are achieved without adversely affecting the handling characteristics of the uncured resin or prepreg that includes the uncured epoxy resin composition. The strength and other structural properties of composite parts that incorporate the cured epoxy resin composition are also not adversely affected.

The following examples demonstrate that composite materials made using matrix resins in accordance with the present invention exhibit unexpectedly high OHC values, which make them well-suited for use in making primary parts and structures in aircraft.

EXAMPLE 8

A composite material sample was prepared and tested for OHC in accordance with BSS 7260. The composite material sample was made from prepreg that included 36.6 weight percent of a resin made according to Example 2. The fibrous support used in the prepreg was IM7G unidirectional carbon fiber tape. The areal weight of the IM7G fiber tape was 190 gsm. An exemplary composite material was formed by making a sixteen-ply laminate from the prepreg and curing it in an autoclave at 177° C. for 120 minutes to form a fully cured composite test sample. The lay up for prepreg is [+45/0/−45/90]2s. The composite material was cut into a test sample that was 30.5 cm×3.8 cm×0.3 cm. At room temperature, the test sample had an OHC in the 0° direction (relative to the unidirectional fibers) of 46.6 ksi. The sample had an OHC in the 90° direction of 50.5 ksi. After 2 weeks of water immersion at 71° C., the OHC of the test sample at 104° C. was determined to be 35.2 ksi in the 0° direction and 38.0 ksi in the 90° direction.

A second test sample was prepared in the same way as the preceding test sample. The 16-ply laminate had a room temperature OHC in the 0° direction of 47.2 ksi. After 2 weeks of water immersion at 71° C., the OHC of the test sample at 104° C. was determined to be 35.1 ksi in the 0° direction.

EXAMPLE 9

An exemplary epoxy resin composition having the following formulation was prepared:
   36.14 weight percent trifunctional epoxy (MY0510)
   18.07 weight percent tetrafunctional epoxy (MY0721)
   15.82 weight percent polyetherimide (ULTEM 1000P)

9.18 weight percent polyamideimide (TORLON 4000TF)

16.49 weight percent 3,3'-DDS 4.29 weight percent 4,4'-DDS

The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI powder having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply exemplary uncured composite material using the same procedure as described in Example 8. The composite material was cured in an autoclave at 177° C. for 120 minutes to form a fully cured composite material that was cut into a test sample in the same manner as Example 8. The sample was tested in the same manner as Example 8 and had a room temperature OHC in the 0° direction of 48.2 ksi. After 2 weeks of water immersion at 71° C., the OHC of test samples at 104° C. was determined to be 34.0 ksi in the 0° direction.

EXAMPLE 10

An exemplary epoxy resin composition having the following formulation was prepared:

36.14 weight percent trifunctional epoxy (MY0510)

18.07 weight percent tetrafunctional epoxy (MY0721)

12.82 weight percent polyetherimide (ULTEM 1000P)

12.18 weight percent polyamideimide (TORLON 4000TF)

16.49 weight percent 3,3'-DDS 4.29 weight percent 4,4'-DDS

The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI powder having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply exemplary uncured composite material using the same procedure as described in Example 8. The composite material was cured in an autoclave at 177° C. for 120 minutes to form a fully cured composite material that was cut into a test sample in the same manner as Example 8. The sample was tested in the same manner as Example 8 and had a room temperature OHC in the 0° direction of 47.2 ksi.

EXAMPLE 11

An exemplary epoxy resin composition having the following formulation was prepared:

36.14 weight percent trifunctional epoxy (MY0510)

18.07 weight percent tetrafunctional epoxy (MY0721)

9.82 weight percent polyetherimide (ULTEM 1000P)

15.18 weight percent polyamideimide (TORLON 4000TF)

16.49 weight percent 3,3'-DDS 4.29 weight percent 4,4'-DDS

The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI powder having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply exemplary uncured composite material using the same procedure as described in Example 8. The composite material was cured in an autoclave at 177° C. for 120 minutes to form a fully cured composite material that was cut into a test sample in the same manner as Example 8. The sample was tested in the same manner as Example 8 and had a room temperature OHC in the 0° direction of 46.3 ksi.

EXAMPLE 12

An exemplary epoxy resin composition having the following formulation was prepared:

36.07 weight percent trifunctional epoxy (MY0510)

18.03 weight percent tetrafunctional epoxy (MY0721)

19.30 weight percent polyetherimide (ULTEM 1000P)

5.86 weight percent polyamideimide (TORLON 4000TF)

16.46 weight percent 3,3'-DDS 4.28 weight percent 4,4'-DDS

The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI powder having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply exemplary cured composite material using the same procedure as described in Example 8. The composite material was cured in an autoclave at 177° C. for 120 minutes to form a fully cured exemplary composite material that was cut into a test sample in the same manner as Example 8. The sample was tested in the same manner as Example 8 and had a room temperature OHC in the 0° direction of 45.5 ksi. After 2 weeks of water immersion at 71° C., the OHC of test samples at 104° C. was determined to be 36.9 ksi in the 0° direction.

COMPARATIVE EXAMPLE 5

A comparative epoxy resin composition having the following formulation was prepared:

39.79 weight percent trifunctional epoxy (MY0510)
19.90 weight percent tetrafunctional epoxy (MY0721)
17.42 weight percent polyetherimide (ULTEM 1000P)
0.00 weight percent polyamideimide (TORLON 4000TF)
18.16 weight percent 3,3'-DDS
4.73 weight percent 4,4'-DDS The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI powder having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply comparative uncured composite material using the same procedure as described in Example 8. The composite material was cured in an autoclave at 177° C. for 120 minutes to form a fully cured comparative composite material that was cut into a test sample in the same manner as Example 8. The sample was tested in the same manner as Example 8 and had a room temperature OHC in the 0° direction of 33.1 ksi. After 2 weeks of water immersion at 71° C., the OHC of test samples at 104° C. was determined to be 33.1 ksi in the 0° direction.

COMPARATIVE EXAMPLE 6

A comparative epoxy resin composition having the following formulation was prepared:
39.92 weight percent trifunctional epoxy (MY0510)
19.96 weight percent tetrafunctional epoxy (MY0721)
10.68 weight percent polyetherimide (ULTEM 1000P)
6.48 weight percent polyamideimide (TORLON 4000T)
18.22 weight percent 3,3'-DDS
4.74 weight percent 4,4'-DDS The two epoxy resins were mixed together at room temperature and heated to 120° C. At 70° C., PEI particles were added and heated to 120° C. with the two epoxies for 2 hours in order to completely dissolve the PEI particles. This mixture was cooled to 90° C. and PAI particles having the same average particle size as Example 8 was added and mixed. This mixture was further cooled to 85° C. and curing agents were added and mixed in thoroughly to form the epoxy resin composition. The resin had viscosity and tack that was similar to existing high performance toughened resins, such as HexPly® resin 8552. The resin was combined with IM7G unidirectional carbon fiber having an areal weight of 197 gsm to form a prepreg layer that had a resin content of 30.8 weight percent. The prepreg was used to form a 16-ply comparative uncured composite material using the same procedure as described in Example 8. The composite material was cured in an autoclave at 177° C. for 120 minutes to form a fully cured comparative composite material that was cut into a test sample in the same manner as Example 8. The sample was tested in the same manner as Example 8 and had a room temperature OHC in the 0° direction of 44.2 ksi. After 2 weeks of water immersion at 71° C., the OHC of test samples at 104° C. was determined to be 35.4 ksi in the 0° direction.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. In an uncured composite part comprising a fiber reinforcement and an epoxy resin composition comprising one or more epoxy resins, polyetherimide and a curing agent, said epoxy resin composition being curable to form a cured resin which, when on fire, is able to self-extinguish once the source of heat and/or flame is removed from said cured resin, wherein the improvement comprises incorporating a sufficient amount of polyamideimide into said epoxy resin composition to reduce the time it takes said cured resin to self-extinguish.

2. The improved uncured composite part according to claim 1 wherein the weight ratio of polyetherimide to polyamideimide is from 3:1 to 1:3.

3. The improved uncured composite part according to claim 1 wherein the weight ratio of polyetherimide to polyamideimide is from 2:1 to 1:2.

4. The improved uncured composite part according to claim 1 wherein the weight ratio of polyetherimide to polyamideimide is from 2.5:1 to 2.9:1.

5. The improved uncured composite part according to claim 1 wherein said curative agent is selected from the group consisting of 3,3'-diaminodiphenyl sulphone, 4,4'-diaminodiphenyl sulphone and dicyandiamide.

6. The improved uncured composite part according to claim 1 wherein said curative agent consists essentially of a combination of 3,3'-diaminodiphenyl sulphone, 4,4'-diaminodiphenyl sulphone and dicyandiamide.

7. The improved uncured composite part according to claim 1 wherein said fiber reinforcement comprises unidirectional fibers.

8. A cured composite part that comprises an uncured composite part according to claim 1 wherein said epoxy resin composition has been cured to form said cured composite part.

9. A cured composite part according to claim 8 wherein said composite part forms at least part of a primary structure of an aircraft.

10. A cured composite part according to claim 8 wherein said composite part has an open hole compression value at room temperature of at least 45 kilograms per square inch.

11. In method for making an uncured composite part wherein one or more epoxy resins are mixed together with polyetherimide and a curing agent to form an epoxy resin composition that is combined with a fiber reinforcement, said epoxy resin composition being curable to form a cured resin which, when on fire, is able to self-extinguish once the source of heat and/or flame is removed from said cured resin, the improvement comprising incorporating a sufficient amount of polyamideimide into said epoxy resin composition to reduce the time it takes said cured resin to self-extinguish.

12. The improved method for making an uncured composite part according to claim 11 wherein the weight ratio of polyetherimide to polyamideimide is from 3:1 to 1:3.

13. The improved method for making an uncured composite part according to claim 11 wherein the weight ratio of polyetherimide to polyamideimide is from 2:1 to 1:2.

14. The improved method for making an uncured composite part according to claim 11 wherein the weight ratio of polyetherimide to polyamideimide is from 2.5:1 to 2.9:1.

15. The improved method for making an uncured composite part according to claim 11 wherein said curative agent is selected from the group consisting of 3,3'-diaminodiphenyl sulphone, 4,4'-diaminodiphenyl sulphone and dicyandiamide.

16. The improved method for making an uncured composite part according to claim 11 wherein said curative agent consists essentially of a combination of 3,3'-diaminodiphenyl sulphone, 4,4'-diaminodiphenyl sulphone and dicyandiamide.

17. The improved method for making an uncured composite part according to claim 11 wherein said fiber reinforcement comprises unidirectional fibers.

18. The improved method according to claim 11 which includes the additional step of curing said epoxy resin composition to form a cured composite part.

19. The improved method according to claim 18 wherein said cured composite part forms at least part of a primary structure of an aircraft.

20. The improved method according to claim 18 wherein said cured composite part has an open hole compression value at room temperature of at least 45 kilograms per square inch.

* * * * *